(12) United States Patent
Joshi et al.

(10) Patent No.: US 9,384,394 B2
(45) Date of Patent: Jul. 5, 2016

(54) METHOD FOR GENERATING ACCURATE LANE LEVEL MAPS

(71) Applicant: Toyota Motor Engineering & Manufacturing North America, Inc., Erlanger, KY (US)

(72) Inventors: Avdhut S. Joshi, Ann Arbor, MI (US); Michael R. James, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 180 days.

(21) Appl. No.: 14/069,069

(22) Filed: Oct. 31, 2013

(65) Prior Publication Data

US 2015/0117723 A1 Apr. 30, 2015

(51) Int. Cl.
| | |
|---|---|
| *G06K 9/00* | (2006.01) |
| *G01C 21/32* | (2006.01) |
| *G01C 21/20* | (2006.01) |
| *G09B 29/10* | (2006.01) |
| *G06K 9/46* | (2006.01) |

(52) U.S. Cl.
CPC ............ *G06K 9/00476* (2013.01); *G01C 21/20* (2013.01); *G01C 21/32* (2013.01); *G06K 9/4604* (2013.01); *G09B 29/106* (2013.01)

(58) Field of Classification Search
None
See application file for complete search history.

(56) References Cited

U.S. PATENT DOCUMENTS

| | | | |
|---|---|---|---|
| 6,212,287 B1 | 4/2001 | Olivieri et al. | |
| 6,278,942 B1 | 8/2001 | McDonough | |
| 6,385,536 B2 | 5/2002 | Kimura | |
| 6,853,913 B2 | 2/2005 | Cherveny et al. | |
| 7,376,508 B2 | 5/2008 | Barkowski et al. | |
| 7,653,482 B2 | 1/2010 | Sumizawa | |
| 7,805,242 B2 | 9/2010 | Fujimoto | |
| 8,204,685 B2 | 6/2012 | Kang et al. | |
| 8,370,028 B2 | 2/2013 | Yamada | |
| 2001/0056326 A1* | 12/2001 | Kimura | G01C 21/30 701/446 |
| 2005/0135658 A1* | 6/2005 | Yamamoto | G06K 9/00798 382/104 |
| 2005/0182518 A1* | 8/2005 | Karlsson | G05D 1/0246 700/253 |
| 2010/0114416 A1* | 5/2010 | Au | G01C 21/165 701/23 |

(Continued)

FOREIGN PATENT DOCUMENTS

| | | |
|---|---|---|
| DE | 102009024153 A1 | 12/2010 |
| EP | 2012088 A2 | 1/2009 |

(Continued)

OTHER PUBLICATIONS

J Hur, S-N. Kang, and S-W Seo, "Multi-Lane Detection in Urban Driving Environments Using Conditional Random Fields," 2013 IEEE Intelligent Vehicles Symposium (IV), Gold Coast, Australia, Jun. 23-26, 2013.*

(Continued)

*Primary Examiner* — Matthew Bella
*Assistant Examiner* — Soo Shin
(74) *Attorney, Agent, or Firm* — Christopher G. Darrow; Darrow Mustafa PC

(57) ABSTRACT

A method for generating accurate lane level maps based on course map information and Lidar data captured during the pass of a sensor carrying vehicle along a road. The method generates accurate lane estimates including the center of each lane, the number of lanes, and the presence of any bicycle paths and entrance and exit ramps using a computer-implemented method where the course map data and the Lidar data are subjected to particle filtering.

11 Claims, 7 Drawing Sheets

(56) References Cited

U.S. PATENT DOCUMENTS

| | | | |
|---|---|---|---|
| 2010/0121569 A1* | 5/2010 | Nakamura | G01C 21/30 |
| | | | 701/532 |
| 2010/0241354 A1 | 9/2010 | Stahlin et al. | |
| 2012/0245817 A1 | 9/2012 | Cooprider et al. | |
| 2012/0310504 A1 | 12/2012 | DuHadway et al. | |
| 2012/0310516 A1* | 12/2012 | Zeng | G01C 21/32 |
| | | | 701/300 |
| 2013/0173150 A1 | 7/2013 | Ghisio | |
| 2014/0297092 A1* | 10/2014 | Delp | G05D 1/0212 |
| | | | 701/25 |

FOREIGN PATENT DOCUMENTS

| | | |
|---|---|---|
| JP | 2006162409 A | 6/2006 |
| JP | 4738360 B2 | 8/2008 |
| JP | 4861851 B2 | 8/2008 |
| KR | 762507 B1 | 10/2007 |
| WO | 2009/064172 A1 | 5/2009 |

OTHER PUBLICATIONS

S Thrun, B Fox, W Burgard, F Dellaert, "Robust Monte Carlo localization for mobile robots," Artificial Intelligence 128 (2001) 99-141.*

MP Parsley and SJ Julier, "Exploiting Prior Information in GraphSLAM," 2011 IEEE International Conference on Robotics and Automation, May 9-13, 2011, Shanghai, China.*

S Kammel and B Pitzer, "Lidar-based lane marker detection and mapping," 2008 IEEE Intelligent Vehicles Symposium, Eindhoven, The Netherlands, Jun. 4-6, 2008.*

ZJ Chong, B Qin, T Bandyopadhyay, MH Ang Jr, E Frazzoli, and D Rus, "Synthetic 2D LIDAR for Precise Vehicle Localization in 3D Urban Environment," 2013 IEEE International Conference on Robotics and Automation (ICRA), Karlsruhe, Germany, May 6-10, 2013.*

A Hegyi, D Girimonte, R Babuska, and B De Schutter, "A comparison of filter configurations for freeway traffic state estimation," 2006 IEEE Intelligent Transportation Systems Conference, Toronto, Canada, Sep. 17-20, 2006.*

J Hur, S-N Kang, and S-W Seo, "Multi-Lane Detection in Urban Driving Environments Using Conditional Random Fields," 2013 IEEE Intelligent Vehicles Symposium (IV), Gold Coast, Australia, Jun. 23-26, 2013.*

Nedevshi et al., "Accurate Ego-Vehicle Global Localization at Intersections Through Alignment of Visual Data with Digital Map", Jun. 2013.

Thrun et al., "The GraphSLAM Algorithm with Applicaiton to Large-Scale Mapping of Urban Structures", The International Journal of Robotics Research, vol. 25, No. 5-6, May-Jun. 2006, pp. 403-429.

Curran, et al., "OpenStreetMap", International Journal of Interactive Communication Systems and Technologies, 2 (1), 69-78, Jan.-Jun. 2012. pp-69-78.

Boyko, et al., "Extracting roads from dense point clouds in large scale urban environment", ISPRS Journal of Photogrammetry and Remote Sensing, Nov. 8, 2011 in 16 pages.

Urmson et al., "Autonomous driving in urban environments: Boss and the urban challenge," Journal of Field Robotics, vol. 25, No. 8, pp. 425-466, 2008.

Levinson et al., "Towards fully autonomous driving: Systems and algorithms," in Intelligent Vehicles Symposium (IV), 2011 IEEE. IEEE, 2011, pp. 163-168.

Doshi et al., "Tactical driver behavior prediction and intent inference: A review," in Intelligent Transportation Systems (ITSC), 2011 14th International IEEE Conference on. IEEE, 2011, pp. 1892-1897.

Oliver et al., "Driver behavior recognition and prediction in a smartcar," in AeroSense 2000. International Society for Optics and Photonics, 2000, pp. 280-290.

Fairfield et al., "Traffic light mapping and detection," in Robotics and Automation (ICRA), 2011 IEEE International Conference on. IEEE, 2011, pp. 5421-5426.

Guizzo, "How Google's Self-Driving Car Works", Oct. 18, 2011, printed from http://spectrum.ieee.org/automaton/robotics/artificial-intelligence/how-google-self-driving-car-works in 3 pages.

Biagioni et al., "Inferring road maps from global positioning system traces," Transportation Research Record: Journal of the Transportation Research Board, vol. 2291, No. 1, pp. 61-71, 2012.

Wang et al., "Automatic road extraction from mobile laser scanning data," in Computer Vision in Remote Sensing (CVRS), 2012 International Conference on. IEEE, 2012, pp. 136-139.

McMichael, S.T., "Lane detection for dexter, an autonomous robot, in the urban challenge," Ph.D. dissertation, Case Western Reserve University, 2008.

Aly, M., "Real time detection of lane markers in urban streets," in Intelligent Vehicles Symposium, 2008 IEEE. IEEE, 2008, pp. 7-12.

Huang et al., "Probabilistic lane estimation using basis curves." Robotics: Science and Systems (RSS), 2010.

Sehestedt et al., "Efficient lane detection and tracking in urban environments," in Proc. European Conf. Mobile Robots, 2007, pp. 126-131.

Meuter et al., "A novel approach to lane detection and tracking," in Intelligent Transportation Systems, 2009. ITSC'09. 12th International IEEE Conference on. IEEE, 2009, pp. 1-6.

Levinson et al., "Map-based precision vehicle localization in urban environments," in Proceedings of Robotics: Science and Systems, Atlanta, GA, USA, Jun. 2007.

Geiger et al., "Vision meets robotics: The kitti dataset," International Journal of Robotics Research (IJRR), to appear.

Thrun et al., "Robust monte carlo localization for mobile robots," Artificial Intelligence Journal, 2001.

* cited by examiner

METHOD FOR GENERATING ACCURATE LANE LEVEL MAPS

BACKGROUND

The present method relates, in, general, to methods and apparatus for generating accurate maps and, more particularly, to methods and apparatus for generating road lane maps.

Maps, in either printed or digitally displayed form, show a road as a single line or as two narrow spaced lines. The width of the space or line may be proportional to the actual width of the road. However, such maps do not show the number of lanes in the road or additional exit lanes, bicycle lanes, etc.

Fully automated driving systems are designed to operate a vehicle on a road without driver interaction or other external control, for example, in self-driving or autonomous vehicles. Such systems require maps that encode lane-level information at high degrees of precision. The lane-level information is used in a variety of situations, such as for generating smooth trajectory for path planning, to predict the behavior of other vehicles, or for planning and reasoning proper vehicle behavior at intersections.

In many cases, such maps are generated either through a tedious manual annotation process, or by driving the exact lane layout with the test vehicle or by analyzing a collection of GPS tracks. These methods require significant amounts of manual work, either through annotation or for collection.

It would be desirable to provide accurate lane-level maps with less preparation effort.

SUMMARY

A method, implemented on a computer, for determining road lane characteristics of a road including obtaining Lidar data of road markers on a road, accessing road map data, determining road segment node locations from the map data, tying the Lidar generated road marker data to the road segment node locations, and applying particle filtering to the road marker road segment locations to lane characteristics estimates.

In the method, applying particle filtering includes using one of a regular particle filter, a dual particle filter and a mixture of the regular particle filter and the dual particle filter.

In the method, using the dual particle filter to estimate the characteristics of one of a bicycle lane adjacent to one lane of a road and a road exit and entrance.

In the method, using the mixture of the regular particle filter and the dual particle filter to detect a transition of one lane of a road into at least one additional road lane and a transition of two side-by-side road lanes into one road lane.

In the method, extracting road lane marker data from the Lidar data.

In the method, refining the lane marker data by use of a GraphSlam algorithm.

In the method, tying the Lidar generated road marker data to the road segment node locations includes generating each of the map road nodes one at a time, computing an angle of one node to an adjacent node, finding a lateral line marker to the one node, forming a set of all line segments within a rectangle, filtering the set of line segments within the rectangle, clustering line segments to the lane markers, computing a mean offset distance, grouping lane markers longitudinally, and calculating binary features of the Lidar generated marker data and map nodes.

In the method, the lane characteristics estimates include at least one of the number of lanes, the width of the lanes, and the center of each lane.

The method of obtaining Lidar data of road markers includes equipping a vehicle with a GPS locator, and a rotating laser beam and a reflected laser beam detector, moving the vehicle along one lane of a road, detecting the intensity of the laser beam reflected from reflective road markers on all lanes of the road as the vehicle moves along the one lane of the road.

BRIEF DESCRIPTION OF THE DRAWING

The various features, advantages and other uses of the present method for generating accurate lane level maps will become more apparent by referring to the following detailed description and drawing in which.

DETAILED DESCRIPTION

Figure 1:
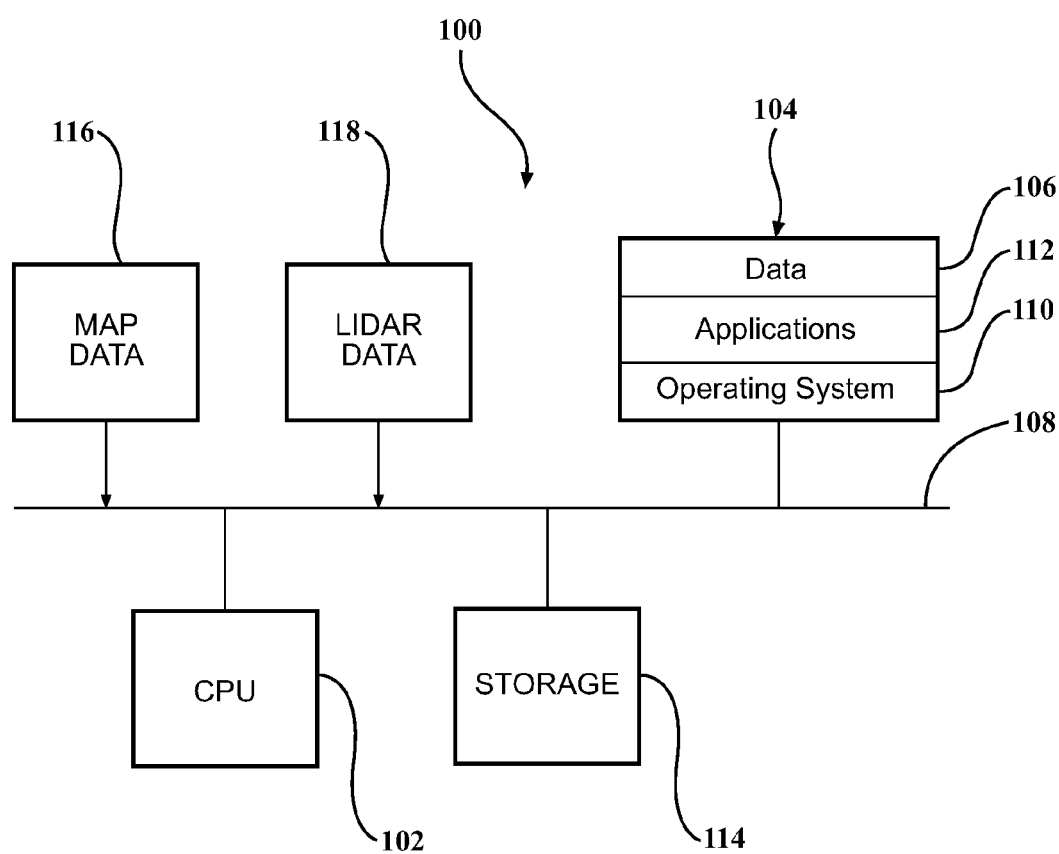
FIG. 1 is a block diagram of a computing device for implementing the disclosed method.

A method for generating accurate lane level maps is implemented on a computing device 100 shown in a block diagram of form in FIG. 1, i.e. computing device 100 can be any type of computing device, including a handheld, desktop, or other form of single computing device, or it can be formed of multiple computing devices. A CPU 102 in the computing device 100 can be a conventional central processing unit or any other type of device, or multiple devices, capable of manipulating or processing information. A memory 104 in the computing device 100 can be a Random Access Memory device (RAM) or any other suitable type of storage device. The memory 104 can include data 106 that is accessed by the CPU 102 using a bus 108. The memory 104 can also include an operating system 110 and installed applications 112. The installed applications 112 include programs that permit the CPU 102 to perform the map road lane-level generation method described herein.

The computing device 100 can also include secondary, additional, or external storage 114, for example, a memory card, flash drive, or other forms of computer readable medium. The installed applications 112 can be stored in whole or in part in the secondary storage 114 and loaded into the memory 104 as needed for processing.

The computing device 100 receives an input 116 in the form of rough or course map data, such as course map data received from the Open Street Map (OSM) project and sensor or 3D Lidar input 118 from sensors mounted on a vehicle which include a high-precision vehicle positioning system.

The map data 116 and Lidar data 118 may be stored in the memory 104 and/or the secondary storage 114.

A test vehicle carrying sensors, typically used in autonomous vehicle systems, generates the Lidar data 118. A pose and motion estimate can come from an Applanix POS-LV 220 inertial GPS Navigational System. This system generates pose estimates at 100 Hz. Lidar data 118 is from a Velodyne HDL-64 E, which uses 64 laser beams and spins at 10 Hz. In addition to 3D position for each Lidar return, the HDL 64E also measures an 8 bit intensity. Appropriate subsets of each Lidar spin are time stamped to the Applanix data so that refinement of the vehicle poses using algorithms described hereafter will result in refined Lidar positions.

The test vehicle may also include forward facing a high definition colored camera, a forward facing radar, a GPS antenna and inertial measurement unit, side facing radars, and a rotary encoder for vehicle travel distance information.

Figure 2:
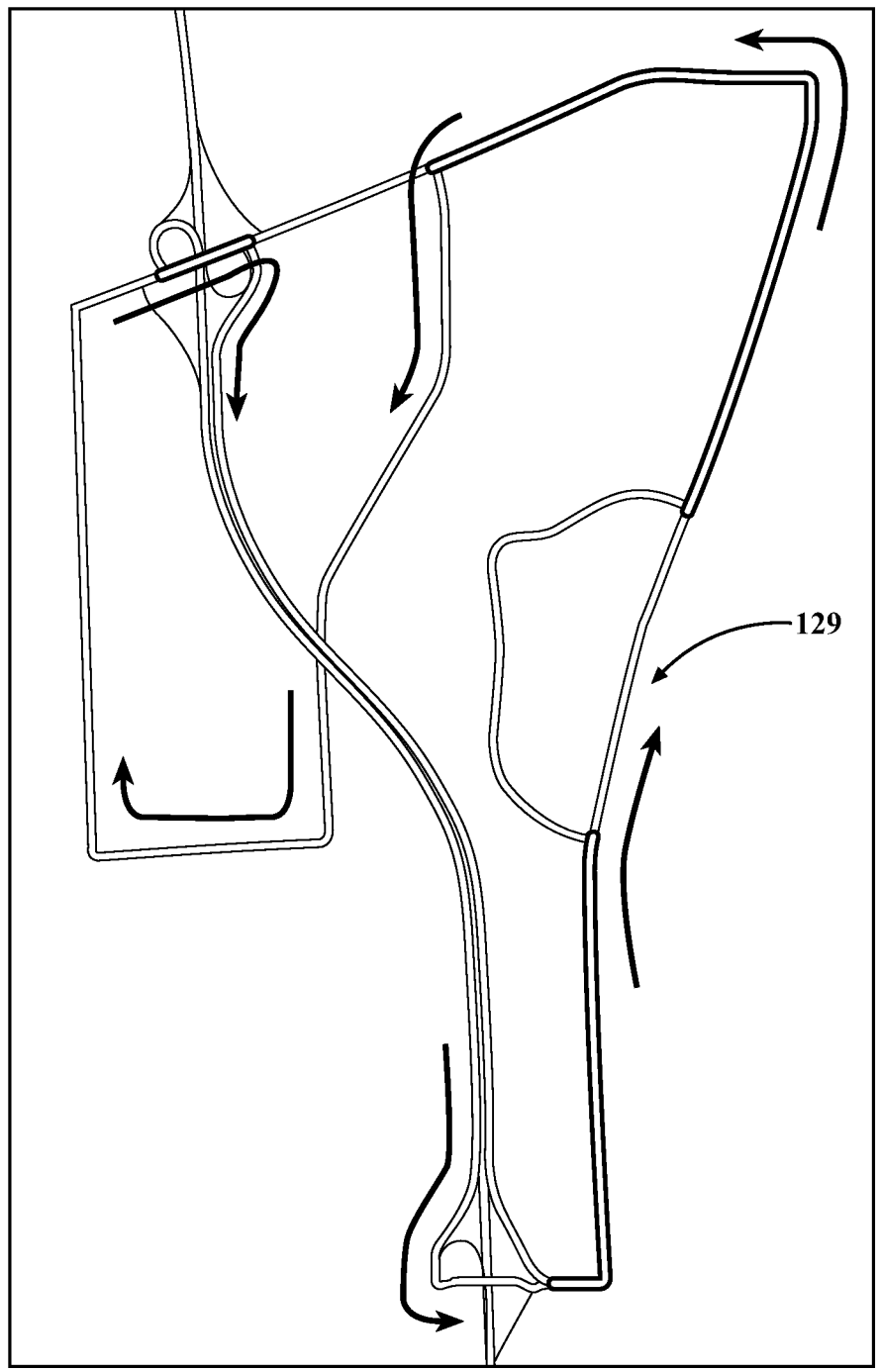
FIG. 2 is a pictorial representation of a road course followed in collecting Lidar information.

The test vehicle is driven in one direction along the route 130, as seen by example in FIG. 2. The route 130 includes a variety of different roads, including a multi-lane freeway with entrance and exit ramps, two lane rural roads and a multi-lane bi-directional street.

The test vehicle is driven in one lane along the route 130 at least once. Multiple passes may be employed to improve the accuracy of the Lidar data by picking up additional road indicators, as described hereafter, which may be hidden or disrupted by adjacent traffic, pole reflectivity, vehicle speed and other factors.

The present method models an inference problem that combines course structured prior map data with precise Lidar measurements in a number of inference algorithms to generate accurate road lane information with only a single pass of a test vehicle along the road. The method generates from the course and precise Lidar data, the number of lanes, the center of each lane as well as the presence of any bicycle paths, entrance and exit ramps, road lane number changes, etc.

Figure 7:
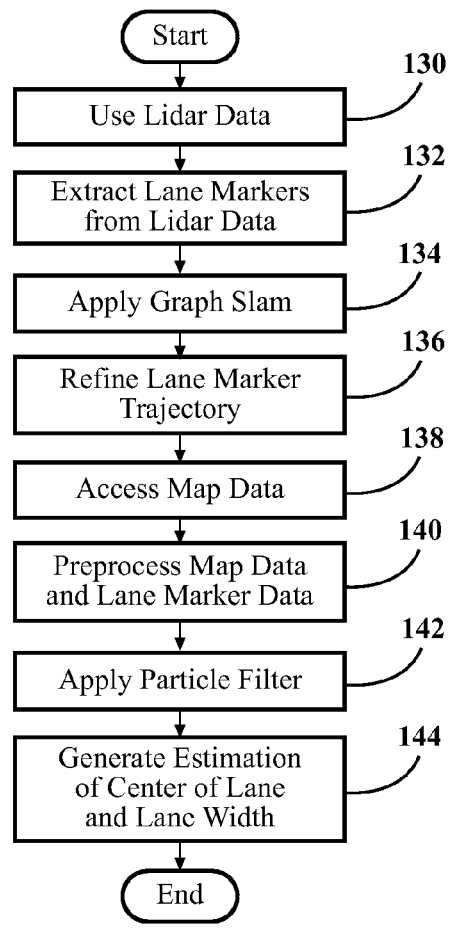
FIG. 7 is a block diagram depicting the steps used in the present method for generating accurate lane level maps.

The first step 130 in the method, as shown in FIG. 7, is to access the Lidar data. This generates mid-level lane features shown in FIG. 3A, and in step 132 in FIG. 7.

A consistent data set is generated by applying a variant of Graph Slam, modified to optimize the vehicle trajectory with respect to a number of distinctive features that can be readily identified from the Lidar data. Such features include lane markers/paint, curves, road signs and poles. Lane markers are of particular interest as they can constitute the primary sensor of data used for lane estimation.

The first step in generating the consistent data step is to apply a 1D Laplacian filter to the intensity (reflectivity) returns for each beam of the 3D laser. This gets a response due to road-paint having different reflectivity characteristics than the road surface. Next, a RANSAC algorithm is applied using the 3D positional data associated with each response to remove outliers and to generate lane-segment features shown by the three lines in FIG. 3A.

Figure 3A:
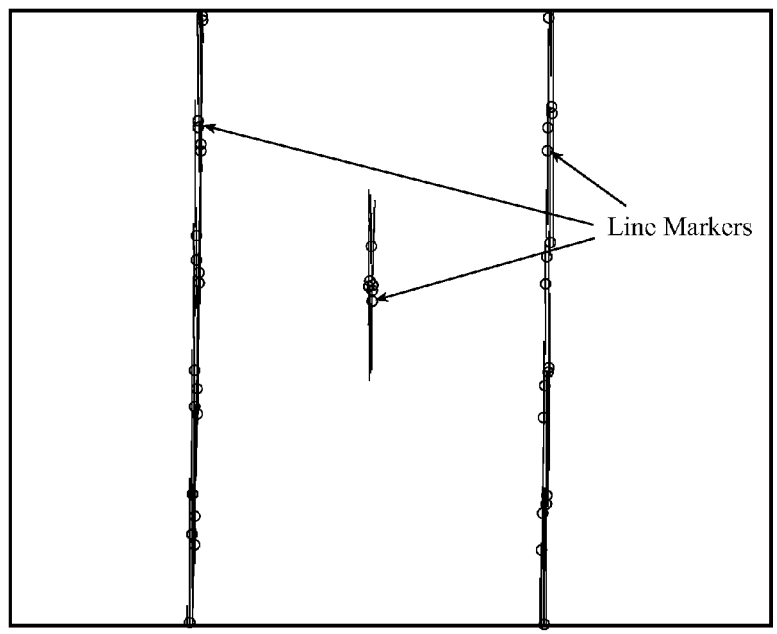
FIGS. 3A, 3B, and 3C are pictorial representations of initial lane features created by the present method.

The GraphSlam algorithm, step 134, FIG. 7, iterates between a data association step and an optimization step. The data association step uses a threshold based on distance. On each data association step, new positions are calculated for each feature based on the new vehicle positions generated from the optimization step. The threshold is increasingly tightened, and this process is repeated until convergent. The output of the GraphSlam algorithm is a refined vehicle trajectory, which is subsequently used to re-project the Lidar scan data as shown in FIG. 3A and step 136 in FIG. 7.

The method makes use of prior weak or course map information, such as OpenStreetMap (OSM) map information. This information is limited in that it has large positional inaccuracy of up to a few meters and it does not contain data about the number of lanes in a particular road. The present method makes use of Lidar scan data to infer precise positional estimates of all lanes in a road.

Figure 3B:
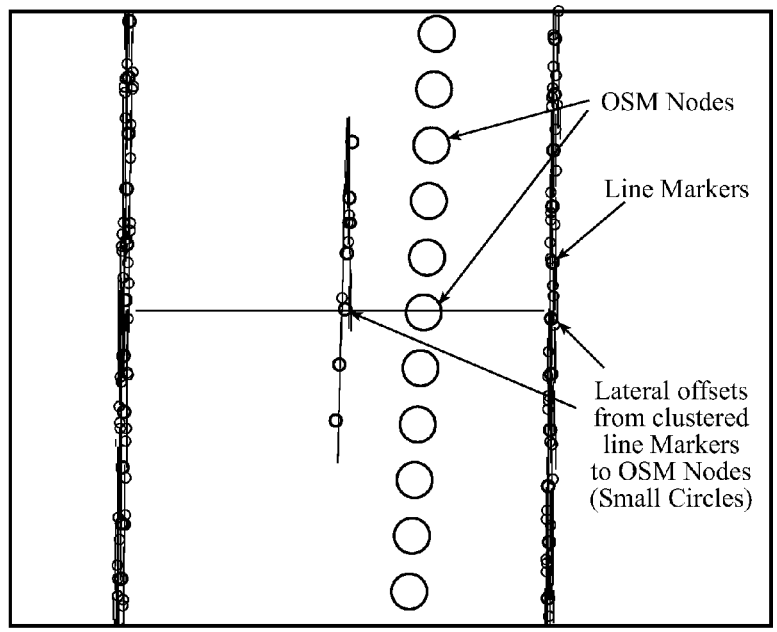

OSM map data is used as a weak prior data on the position and existence of a road, see step 138, FIG. 7. A way in OSM is defined by $(p_1, p_2, \ldots p_n)$: a set of nodes along the way. These nodes are evenly spaced at $\delta_o=1$ meter intervals. The lane marker estimations process uses the same lane marker/paint features that were used in the GraphSlam algorithm, which take the form of relatively short (0.5 to 2 meter) line segments $\lambda$ specified by 3D coordinates of both endpoints, step 140, FIG. 7. For each OSM node $p_i$, first, the angle $\theta_i$ to node $p_{i+1}$ is computed, and then a search is performed to find the line markers lateral to the OSM node. The search is over a rectangle defined by the vectors of length $\delta_o/2$ forward and backward along $\theta_i$, and for a fixed distance in both directions perpendicular to $\theta_i$. All line segments falling within this rectangle are collected into a set $\Lambda_i=(\lambda_j)$. This set is then filtered based on each segments' alignment to $\theta_i$, resulting in $\Lambda_j=\{\lambda_j: \lambda_j \in \Lambda_i, \|\theta_{\lambda j}-\theta_i\| \theta_{thresh}\}$, where $\theta_{\lambda j}$ is the angle of the line segment. Then all the line segments $\lambda$ are clustered using a greedy approach based on separation distance. The resulting clusters are called lane markers. For each lane marker, the mean offset distance $z_i$ from the OSM node $p_i$ is computed. This offset distance will be used as an observation tied to this particular OSM node within the particle filter, as shown in FIG. 3B.

Next, the lane markers are grouped longitudinally, using a greedy, flood-fill algorithm in the longitudinal direction. The purpose of this step is to generate additional binary features for each lane marker. Some groups of lane markers, such as those corresponding to solid, well-painted lines, will extend for a long longitudinal distance (tens or hundreds of meters) on rural or semi-rural roads, while in other cases, such as dashed lines, or areas with many intersections, the groups will be short, on the order of a few meters.

Given these groupings, three additional features are computed which prove to be useful for lane estimation. First two binary features are calculated which encodes on which side(s) of the lane marker a lane can exist (e.g. for a right most lane marking, a lane on the right cannot exist). These binary features are computed, namely, has-l and has-r, by looking at the entire lane segment data. For the entire lane segment, count the number of lane marking observations ($z_i$) that lie on the either side ($c_k^j$ and $c_k^r$), are then counted. Then, $$\text{has-}j = (c_k^j \leq \delta_c), j \in \{l,r\}$$

where $\delta_c$ is a threshold parameter. The third binary variable encodes where a lane marker is dashed. All of the lanes are filtered out which are bigger than a standard dash lane found in US. Then lane marker groups are connected which are at a set distance apart and have similar orientation. These are marked as a dashed line.

Figure 3C:
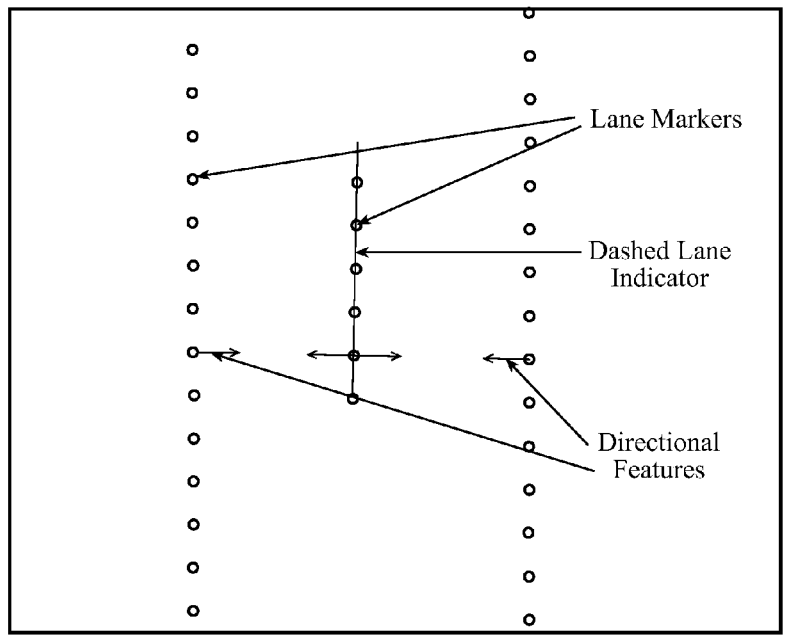

The above binary features illustrated in FIG. 3C, give important cues to interpreting the lane data, as will be shown in the development of the measurement function for the particle filters.

Multiple approaches exist for particle filtering for this domain. These approaches are outlined starting here with some basic definitions that are common to all. As noted above, the particle filter evolution is based on the structure of the OSM nodes, with successive steps in the filter transitioning from one OSM node to the next. The state of each particle is based on its relation to the OSM node (which then ties it to a physical location). With this in mind, filtering equations are derived from a basic definition of the state of the map that to be estimated:

$$X_n: \{x_n^1, x_n^2, \ldots x_n^m\},$$

Where m is number of lanes estimated at $n^{th}$ node in OSM way and $x_n^i$ is state of the lane estimate. The state of each lane is its offset from the OSM node and its width $\{o_n^i, w_n^i\}$. Using the observations $z_n \rightarrow \{\text{Lane markers observed at the } n^{th} \text{ OSM node}\}$, the belief state is $$\text{Bel}(x_n)=p(x_n|z_n,z_{n-1},\ldots z_0) \qquad (1)$$

Using recursive Bayes filtering as defined for equation(1) yields $$Bel(x_n) \propto p(z_n|x_n) \int p(x_n|x_{n-1}) Bel(x_{n-1}) dx_{n-1} \quad (2)$$

To implement a particle filter, step 142, FIG. 7, the quantities $p(z_n|x_n)$ and $p(x_n|x_n-1)Bel(x_n-1)$ are estimated. For all algorithms, $Bel(x_n)$ is represented as a set of m weighted particles $$Bel(x) \approx \{x^{(i)}, \phi^{(i)}\}_{i=1,\ldots m}$$

where $x^{(i)}$ is a sample of state (lane estimate) and $\phi^{(1)}$ is a non-negative parameter called the importance factor or weight. The other necessary quantities are described in depth in each of the following sections.

The implementation of the regular particle filter follows the following three steps:
1. Sampling: Sample $x_{n-1}^{i} \sim Bel(X_{n-1})$ from the weighted sample set representing $Bel(x_{n-1})$.
2. Proposal Distribution: Sample $x_n^{(i)} \sim p(x_n|x_{n-1}^{(i)})$ Since the particle state only evolves in relation to OSM nodes, and OSM maps are highly inaccurate in both position and direction, $x_n$ is sampled by adding Gaussian noise to $x_{n-1}^{i}$:

$$x_n^{(i)}: \{o_{n-1}+N(0,\sigma_o), w_{n-1}^{(i)}+N(0,\sigma_w)\}$$

Now pair $(x_n^{i}, x_{n-1}^{i})$ is distributed according to $p(x_n|x_{n-1}) Bel(x_{n-1})$
3) Update Function: the weight of each sample is updated according to following distribution.

$$\phi_n^{(i)} = p(z_n|x_n^{(i)})$$

$z_n: \{l_1, l_2, \ldots l_k\}$, where $l_j$ are lane markers observed at $n^{th}$ node.

For each $x_n^{(i)}$, perform data association with lane observations, i.e., determine associated lane markings for $x_n^{(i)}$.

Compute new observed lane offset and lane width from the observations $$\{\tilde{o}_n^{(i)}, \tilde{w}_n^{(i)}\}.$$

Compute $\phi_n^{(i)}$ using the following equation $$\phi_n^{(i)} = \frac{1}{2\sigma_o} e^{\left(\frac{-(\tilde{o}_n^{(i)} - o_n^{(i)})^2}{2\sigma_o}\right)} \frac{1}{2\sigma_w} e^{\left(\frac{-(\tilde{w}_n^{(i)} - w_n^{(i)})^2}{2\sigma_w}\right)}$$

where $\sigma_o$ and $\sigma_w$ are parameters selected to fit typical standard deviations on width and location based on our data.

During the data association, the appropriate binary variables has-l and has-r are checked and ambiguous data associations are removed (e.g. if the state of a particle is to the left of the left most lane, then it is not associated with the any lane markings). If the above data association fails, the $\phi_n^{(i)}$ is penalized by a penalty factor γ. This penalty factor is relaxed if dashed lane markings are present as the markings are expected to be missing periodically.

In order to recover from lane additions or exits in natural road environment, the sampling scheme stated above is extended. A new parameter t, which is percentage of new particles introduced in the system on every update is introduced. Hence, sampling is performed according to Algorithm 1, where $\mu_w$ is the expected lane width. Note that selecting large standard deviation means that a large number of new proposed particles (and corresponding computational) are required to sufficiently cover the state space. Further, having large standard deviations increases the change of proposing an erroneous particle that matches the noise in the data.

Figure 4:
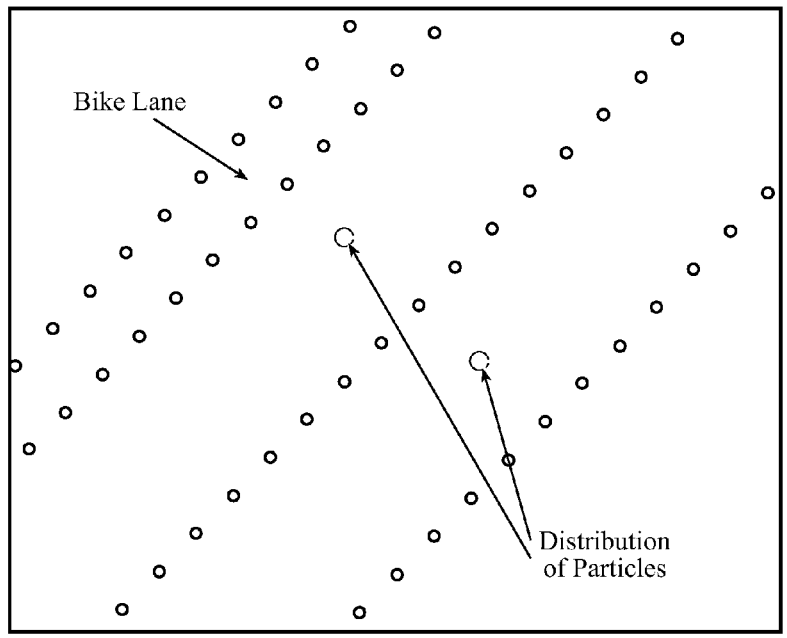
FIG. 4 is a pictorial representation of a road lane implemented using a particle filter algorithm.

FIG. 4 illustrates the output of the Regular Particle Filter, step 144, FIG. 7, estimating lanes at one of the OSM nodes.

```
Input: m → number of particles
Input: t → percentage of new particles
for i _ 1:m* (1-t)do
    Sample x_{n-1}^{(i)} ~ Bel(x_{n-1});
    Add x_{n-1}^{(i)} → Bel(x_{n-1});
End
i _ 1:m * t do
    Generate new state^{x_{n-1}^{(i)}: {N(0,σ_o)N(μ_ω σ_ω)}};
    Set ^{Φ}_{n-1}^{(i)}: ∈
    Add^{x_{n-1}^{(i)}} → B̂el(x_{n-1});
end
Replace ^{Bel(x_{n-1}) with B̂el(x_{n-1})}
```

One issue observed when applying the regular particle filter is its failure to capture lanes with abnormal specifications (like bike lanes or extra wide ramps) ramps) as shown in FIG. 4. While this could be addressed by increasing the standard deviation of new particles, this solution is suboptimal for reasons discussed above. A dual method of particle filtering will now be described in order to formally tackle this problem. In the dual particle filtering configuration, the role of proposal distribution and measurement function as stated above are reversed. At every iteration new particles are sampled based on their agreement with the observations $x_n^{(i)} \sim p(z_n|x_n)$ and importance factors are set using $$\phi_n^{(i)} = \int p(x_n^{(i)}|x_{n-1}^{(i)}) Bel(x_{n-1}) dx_{n-1}$$

The algorithm is then:
1) Proposal Distribution: New particles are proposed based on those observations. Let $z_n: \{l_1, \ldots l_k\}$ be k lane markers observed at nth OSM node, sorted by location j∈ {1, (k-1)} is uniformly selected and;

$$x_n^{(i)}: \left\{\frac{l_j + l_{j+1}}{2} + N(0, \sigma_o); (l_{j+1} - l_j) + N(0, \sigma_w)\right\}$$

Update Function: Importance factors for each particle are then corrected using the prior belief $Bel(x_{n-1})$. To approximate this distribution over the continuous state space, a kernel density approach is taken. First m samples are generated as done for the proposal distribution in a conventional particle filter.

$$x_n^{(i)} \sim p(x_n|x_{n-1}) Bel(x_{n-1})$$

Writing $h(\{\tilde{x}_n\}; x)$ to denote the parameterized kernel density function approximating this distribution, the importance factor for each particle is given by $$\phi_n^{(i)} = h(\{x_n\}: x_n^{(i)})$$

Figure 5:
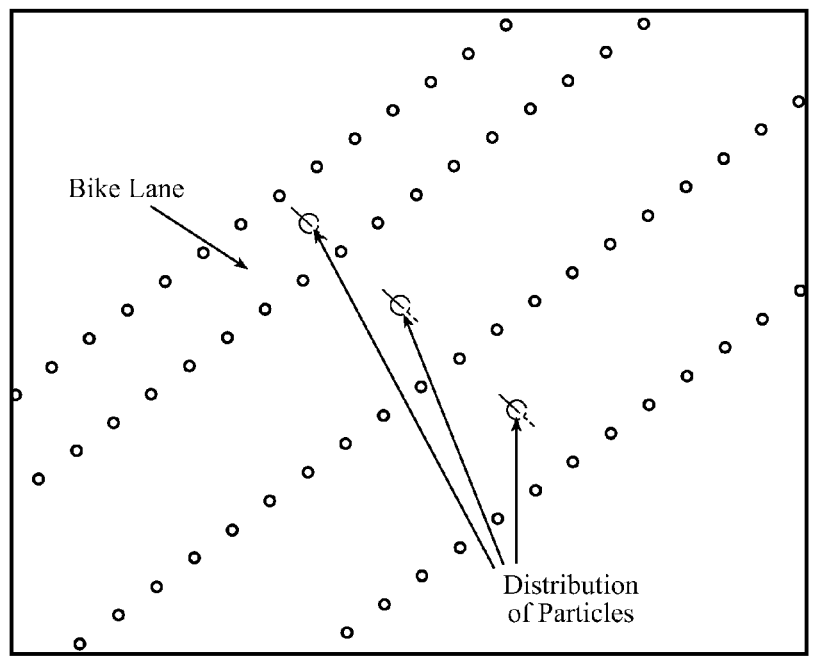
FIG. 5 is a pictorial representation of a road lane features created by a dual particle feature.

As shown in FIG. 5, the Dual Particle Filter is able to estimate non-standard bike lane, which the regular Particle Filter failed to capture.

Figure 6A:
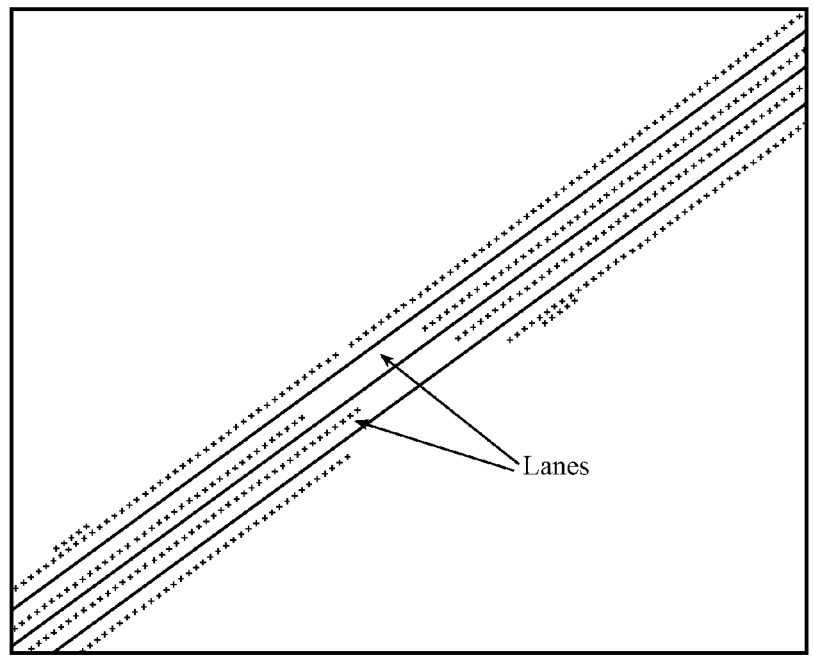
FIGS. 6A, 6B, 6C, and 6D are pictorial representations of road lane estimations generated by the present method.
Figure 6B:
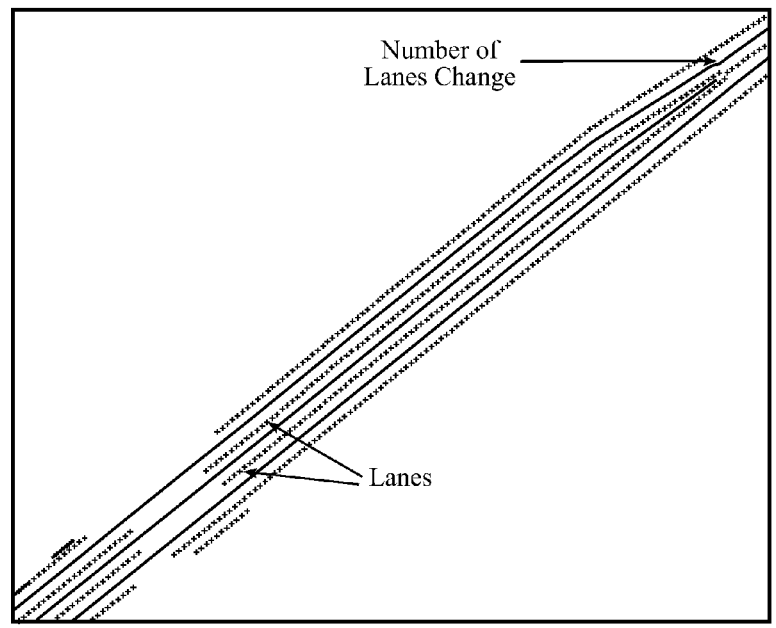

While the pure Dual Particle Filter is able to capture abnormal lane specifications, it will fail in the situation where new lanes are added, or multiple lanes merge into one lane as shown in FIG. 6B. Proposed particles for new lanes cannot be matched to any in the previous distribution, thus getting essentially zero weight. The approach described above fixes this problem using a mixture of both Regular and Dual Particle Filters. In the Mixture approach, variable mixture ratio θ(0≤θ≤1) is used and sample from the regular particle filter method with probability 1−θ and with probability θ using the dual particle filter.

Additionally, the Mixture Particle Filter allows for more flexible modeling based on situational information. For instance the mixture ratio θ can be varied based on structural information from the OSM map. Specifically, the ratio is reduced closer to intersections where performance of dual the particle filter is significantly impaired due to the lack of lane markings.

The generated map will have only a finite number of lanes, each with a single lane position and width estimate for each OSM node, step 144, FIG. 7. Further, these lanes should be linked over iterations using IDs. This requires one further processing step. The particle filters above result in a discrete approximation of $Bel(x_n|z_n)$ represented by a set of particles. This distribution can be observed in FIG. 4. This distribution is multi-modal and numbers of modes are unknown apriori. An EM-based weighted clustering algorithm is used on the distribution to find the maximum-a-posteriori modes. These cluster centers are final lane estimates. The clustering is done in the space of x (i.e. on both offset and width).

To generate temporal links between iterations, an index is assigned to each cluster using a cluster indexing algorithm:

```
Input: p → set of particles
Input: C → Clusters
for c = 1 : C do
  i → Most common index in the set of particles
  belonging to cluster c;
  else
  assign new index → to cluster c and all the |
  particles belonging to cluster c;
  end
end
```

Referring now to FIGS. 6A-6B, lane estimates using the present method are illustrated. FIGS. 6A and 6B show lane estimations on country roads. Even though there is missing data intersections, the two road lanes are tracked successfully.

Figure 6C:
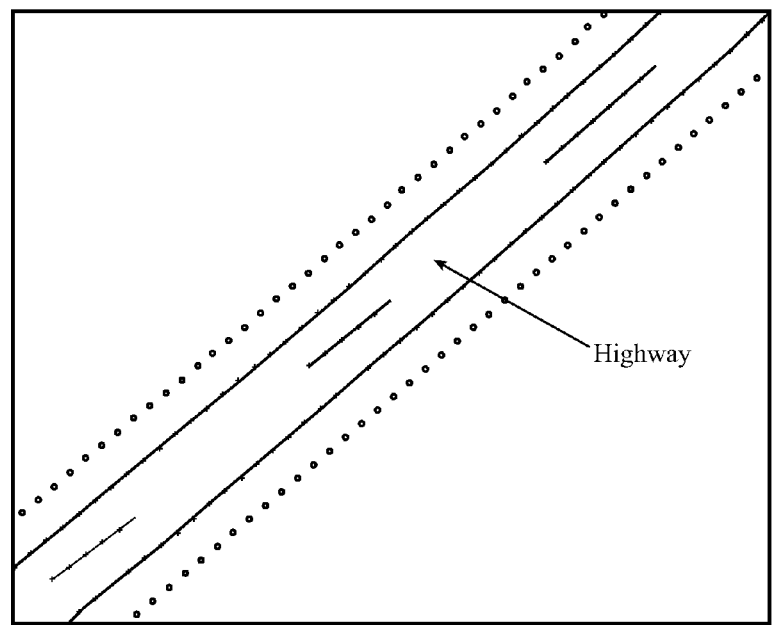
Figure 6D:
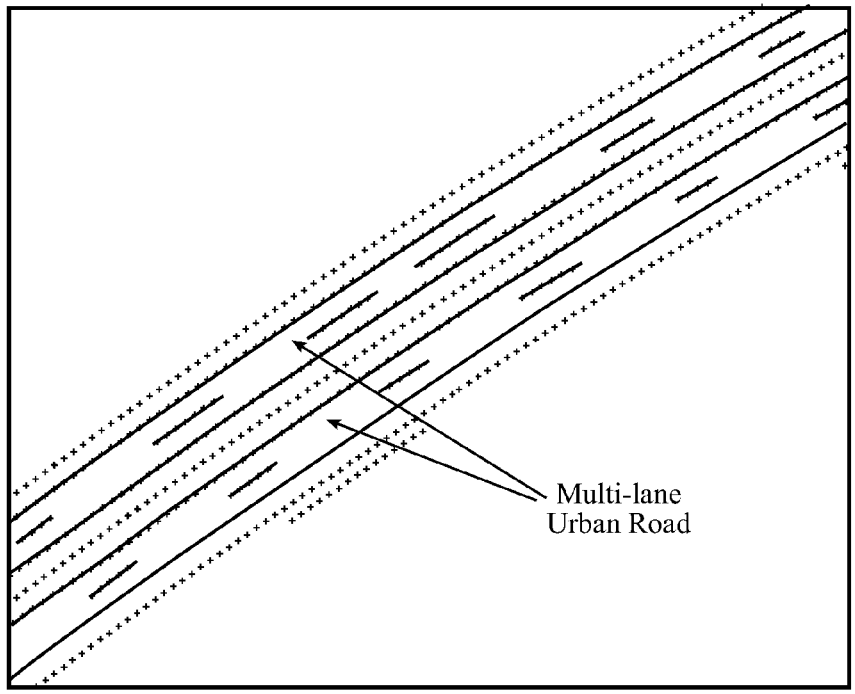

FIG. 6C depicts lane estimation on a highway with dashed lines. FIG. 6D illustrates lane estimation on multi lanes urban roads.

In all of the lane estimation situations shown in FIGS. 6A-6D, the method did not have any prior information of the number of lanes in each road.

What is claimed is:

1. A method for determining road lane characteristics of a road, the method comprising:
   obtaining Lidar data of road markers on the road, and extracting road lane marker data from the Lidar data;
   accessing road map data;
   determining road segment node locations from the road map data, wherein the nodes are evenly spaced at an interval defined by $\delta_o/2$;
   searching for line segments lateral to the nodes, wherein the searching is performed over a rectangle defined by vectors of a length $\delta_o/2$;
   tying the Lidar generated road marker data to respective road segment node locations;
   applying particle filtering, using a dual particle filter, to the road lane marker data and road segment node locations to estimate road lane characteristics including at least one of a bicycle lane, a road exit, and a road entrance adjacent to the road; and
   generating a road lane map including the road lane characteristics.

2. The method of claim 1 wherein the step of applying particle filtering comprises:
   using both a regular particle filter and the dual particle filter.

3. The method of claim 1 further comprising:
   using both a regular particle filter and the dual particle filter to detect: (1) a transition of one lane of a road into at least two side-by-side road lanes, or (2) a transition of two side-by-side road lanes into one road lane.

4. The method of claim 1 further comprising:
   refining the road lane marker data by use of a GraphSlam algorithm.

5. The method of claim 1 wherein the step of tying the Lidar generated road marker data to the road segment node locations comprises:
   generating each of the road segment node locations one at a time;
   determining side boundaries of a road lane at the one node;
   forming a set of all line segments within the rectangle;
   filtering the set of line segments within the rectangle;
   clustering line segments to the lane markers;
   computing a mean offset distance;
   grouping lane markers longitudinally; and
   calculating binary features of the Lidar generated marker data and map nodes.

6. The method of claim 1 wherein the road lane characteristics further include at least one of a number of lanes, a width of the lanes, and a center of each lane.

7. The method of claim 1 wherein the step of obtaining Lidar data of road markers comprises:
   equipping a vehicle with a GPS locator, a rotating laser beam, and a reflected laser beam detector;
   moving the vehicle along one lane of the road; and
   detecting the intensity of the laser beam reflected from reflective road markers on all lanes of the road as the vehicle moves along the one lane of the road.

8. A method of generating a road lane map, the method comprising:
   extracting road lane marker data from Lidar data obtained by a vehicle moving along one lane of a road;
   tying the extracted road marker data to respective road segment node locations obtained from prior road map data, wherein the nodes are evenly spaced at an interval defined by δo, and a search for line markers lateral to the nodes is performed over a rectangle defined by vectors of a length δo/2;
   using both a regular particle filter and a dual particle filter applied to the road lane marker data or the road segment node locations to detect lane characteristics including at least one of: (1) a transition of one lane of a road into at least two side-by-side road lanes, and (2) a transition of two side-by-side road lanes into one road lane; and
   generating a road lane map depicting the detected lane characteristics.

9. The method of claim 8 further comprising:
   using particle filtering to detect at least one of a bicycle lane, a road exit, and a road entrance adjacent to the one lane of the road.

10. The method of claim 8, further comprising:
    refining the road lane marker data by use of a GraphSlam algorithm.

11. The method of claim 8 further comprising:
    detecting at least one of a number of lanes, a width of the lanes, and a center of each lane of the road.

\* \* \* \* \*